US008272840B2

(12) United States Patent
Yan (10) Patent No.: US 8,272,840 B2
(45) Date of Patent: Sep. 25, 2012

(54) BLADE SUPPORT LIMB FOR VERTICAL AXIS WIND TURBINE

(76) Inventor: Qiang Yan, Shanghai (CN)

( * ) Notice: Subject to any disclaimer, the term of this patent is extended or adjusted under 35 U.S.C. 154(b) by 180 days.

(21) Appl. No.: 12/422,963

(22) Filed: Apr. 13, 2009

(65) Prior Publication Data

US 2009/0196753 A1   Aug. 6, 2009

Related U.S. Application Data

(63) Continuation of application No. PCT/CN2007/001984, filed on Jun. 25, 2007.

(30) Foreign Application Priority Data

Oct. 11, 2006   (CN) .......................... 2006 1 0117017

(51) Int. Cl.
*F03D 7/06* (2006.01)

(52) U.S. Cl. ........ 416/107; 416/106; 416/118; 416/119; 416/140

(58) Field of Classification Search .......... 416/103–107, 416/118, 119, 138, 140–141
See application file for complete search history.

(56) References Cited

U.S. PATENT DOCUMENTS

| | | | | |
|---|---|---|---|---|
| 588,143 | A * | 8/1897 | Hall | 416/119 |
| 1,859,584 | A * | 5/1932 | De La Cierva | 416/107 |
| 2,554,774 | A * | 5/1951 | Buivid | 416/119 |
| 3,995,170 | A * | 11/1976 | Graybill | 416/119 |
| 4,299,537 | A * | 11/1981 | Evans | 416/119 |
| 4,496,283 | A * | 1/1985 | Kodric | 416/119 |
| 4,718,821 | A * | 1/1988 | Clancy | 416/119 |
| 6,379,115 | B1 | 4/2002 | Hirai | |
| 6,398,496 | B1 * | 6/2002 | Jokinen | 416/105 |
| 7,780,411 | B2 | 8/2010 | Yan | |
| 7,967,569 | B2 | 6/2011 | Yan | |
| 2009/0100676 | A1 | 4/2009 | Yan | |

FOREIGN PATENT DOCUMENTS

| | | | |
|---|---|---|---|
| CN | 85103919 | A | 10/1986 |
| CN | 85103919 | A * | 10/1986 |
| CN | 2434445 | A | 6/2001 |
| CN | 1831330 | A | 9/2006 |
| CN | 1844662 | A * | 10/2006 |
| CN | 1844662 | A | 10/2006 |
| CN | 200610028267.7 | | 12/2006 |
| DE | 4442861 | A1 * | 6/1996 |
| DE | 4442861 | A1 | 6/1996 |
| DE | 19544400 | A1 | 6/1997 |
| DE | 19544400 | A1 * | 6/1997 |
| EP | 0021790 | A1 | 1/1981 |
| FR | 2548740 | A1 | 1/1985 |

* cited by examiner

*Primary Examiner* — Christopher Verdier
(74) *Attorney, Agent, or Firm* — Manni Li; Mei & Mark LLP (57) ABSTRACT

A blade support limb structure of a vertical axis wind power generator includes a fixed support limb (1) and a rotatable support limb (2), one end (21) of the rotatable support limb is connected with one end (22) of the fixed support limb and the rotatable support limb may rotate around it. The structure keeps a wind wheel at stable rotation speed in the case the environmental wind speed exceeds the rated wind speed, thereby to ensure that vertical axis wind power generator outputs constant power. The structure solves a problem of constant power output of the vertical axis wind power generator from hundreds watts to thousands watts, so its applications are wide.

16 Claims, 5 Drawing Sheets

BLADE SUPPORT LIMB FOR VERTICAL AXIS WIND TURBINE

CROSS-REFERENCE TO RELATED APPLICATIONS

This application is a continuation of International Patent Application No. PCT/CN2007/001984 with an international filing date of Jun. 25, 2007, designating the United States, now pending, and further claims priority benefits of Chinese Patent Application No. 200610117017.0 filed Oct. 11, 2006. The contents of all the aforementioned specifications, including any intervening amendments thereto, are incorporated herein by reference.

BACKGROUND OF THE INVENTION

1. Field of the Invention

This invention relates to a blade support limb, and particularly to a blade support limb for a vertical axis wind turbine.

2. Description of the Related Art

Figure 1:
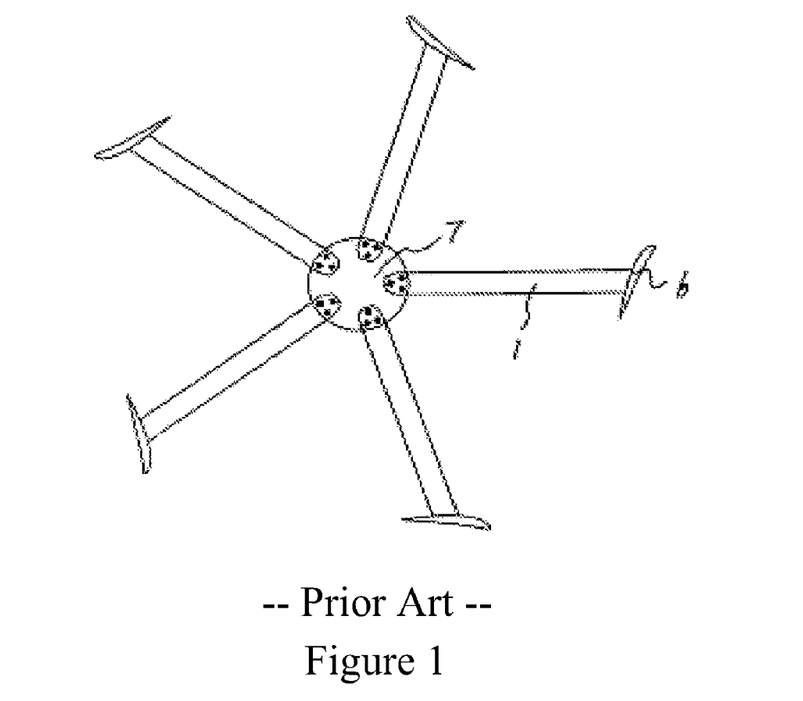
FIG. 1 is the structural diagram of the blade support limb in the existing technology.
Figure 2:
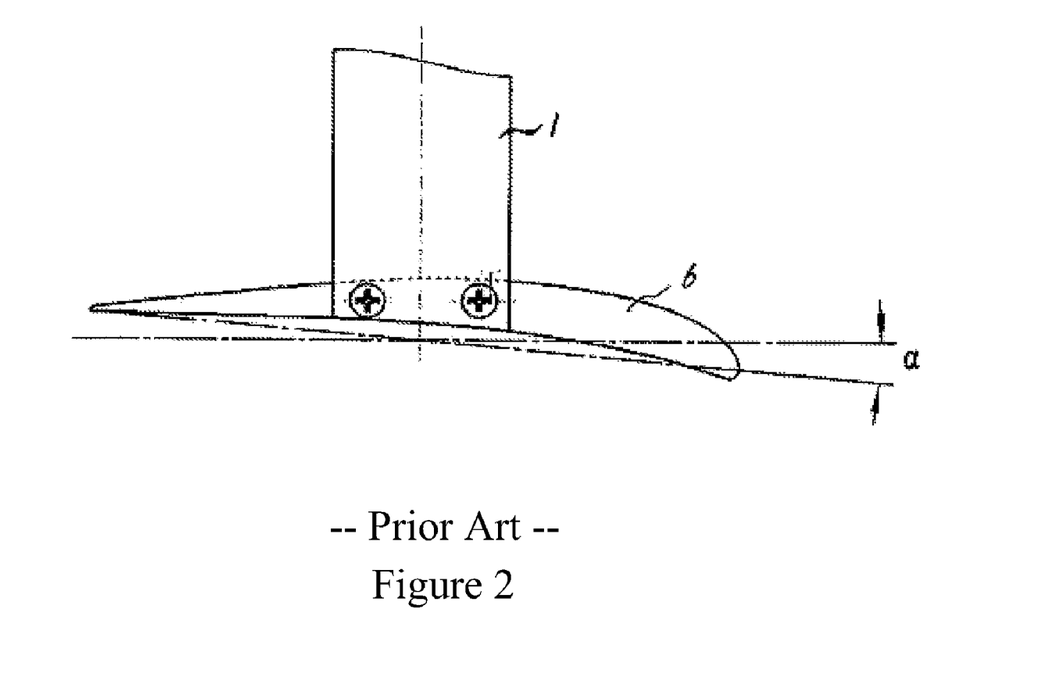
FIG. 2 is the schematic diagram of the fixing and installing blades in the existing technology.

Vertical axis wind turbines are widely used for generating power and each comprises a wind rotor. However, there is a non-neglectable problem with the existing vertical axis wind turbines: as an ambient wind speed is greater than a rated wind speed, a power output of a wind rotor correspondingly increases, as the ambient wind speed is far greater than the rated wind speed, the wind rotor is incapable of operating. FIG. 1 shows the structure of the blade support limb in the prior art. The wind mill of the vertical axis wind turbine adopts straight airfoil blades (6). The blades are parallel to the vertical shaft (7). The blades are usually fixed on one end of the blade support limbs (1) that rotate around the vertical shaft (7). When the wind blows on the blades at certain angles, the lift and drag are produced on the blades. When the lift exceeds the drag, a moment of rotation around the vertical shaft is produced on the blades to drive the wind mill to rotate. FIG. 2 shows the installation method for blades in the prior art. The line between the leading edge and the trailing edge of a blade is called the "chord," and the angle formed between blade chord and the tangent is called the "blade rotation angle," which can be represented by a. When the blade chord is parallel to the tangent, a is zero degree. When the blade rotates clockwise around the vertical shaft, a is positive, and when the blade rotates counter-clockwise around the vertical shaft, a is negative. The blades are usually fixed on one end of blade support limbs (or cantilever supports or support limbs) or ring supports and usually can't rotate relative to the support limbs, i.e., the blade rotation angle α is fixed. One end of the blade support limb is connected to the blade, and the other end is connected to the vertical shaft.

Normally, the blade is installed at a cantilever support limb (or cantilever support or blade support limb) or ring support and cannot rotate relative to the blade support limb, i.e., a fixed support limb structure with constant blade rotation angle α, one end of the blade support limb is connected with the blade, and other end of it is connected with the vertical axis.

For the effect of blade rotation angle α on the rotation speed of the wind rotor of vertical axis wind turbine, please refer to Chinese Patent Application Publication No. CN1831330A and Chinese Patent Application No. 200610028267.7 by the same inventor.

When the blade rotation angle α is small, the wind rotor can get a relatively high rotation speed and wind energy utilization ratio. For a vertical axis wind turbine with constant blade rotating angle α, the rotation speed of its wind rotor is proportional to the environmental wind speed. Under a constant blade rotation angle α, the higher the environmental wind speed, the higher the rotation speed of wind rotor. The wind energy is proportional to the cube of the environmental wind speed. When the environmental wind speed increases from 10 m/s to 25 m/s, the wind energy increases by nearly 16 times. Therefore, the vertical axis wind turbine needs to have a motor with relatively high power to match with the wind rotor so that it can maintain operation under a relatively high environmental wind speed. And thus the designed rated wind speed of the vertical axis wind turbine must be very high. However, considering the characteristics of a motor, if the rated wind speed is high, the power will be very low under a low wind speed. And there are mostly low wind speeds under the natural state, which thus decreases the efficiency of the vertical axis wind turbine. To enable the vertical axis wind turbine to maintain the rated output power within a relatively wind range of wind speeds, the wind rotor must still maintain a relatively constant rotation speed and output power after the environmental wind speed exceeds the rated wind speed so as to enable the vertical axis wind turbine to maintain operation under a relatively wide range of wind speeds and thus to enhance the value of vertical axis wind turbine.

Existing schemes overcoming such technical defects are to increase load resistance for small wind turbine with hundreds watts, apply "yawing and adjusting the pitch of blades" to large horizontal axis wind turbine and change angle of attack for large vertical axis wind turbine. Please refer to the Chinese Patent Application Publication No. CN1831330A and Chinese Patent Application No. 200610028267.7 by the same inventor. However, considering the costs, such schemes are not suitable for the vertical axis wind turbine from several kilowatts to dozens of kilowatts output.

SUMMARY OF THE INVENTION

The present invention is specific to address the deficiency in the existing technology and overcomes the design defects of the existing vertical axis wind turbine, providing a blade support limb structure of vertical axis wind turbine. The structure solves the problem of constant power output of vertical axis wind turbine from several watts to dozens of watts or even hundreds of kilowatts and is applicable to small vertical axis wind turbine with hundreds of watts in place of the current coarse method of unloading by load resistance, so its application is wide.

The specific technical scheme of the present invention is described as follows.

A blade support limb structure of the vertical axis wind turbine includes a fixed support limb (1) and a rotatable support limb (2), one end (21) of the rotatable support limb is connected with one end (12) of the fixed support limb and the rotatable support limb may rotate around it.

There is a gyration center axis (3) at the connection of one end (21) of the rotatable support lime and one end (12) of the fixed support limb, and the rotatable support limb (2) may rotate around it.

Figure 5:
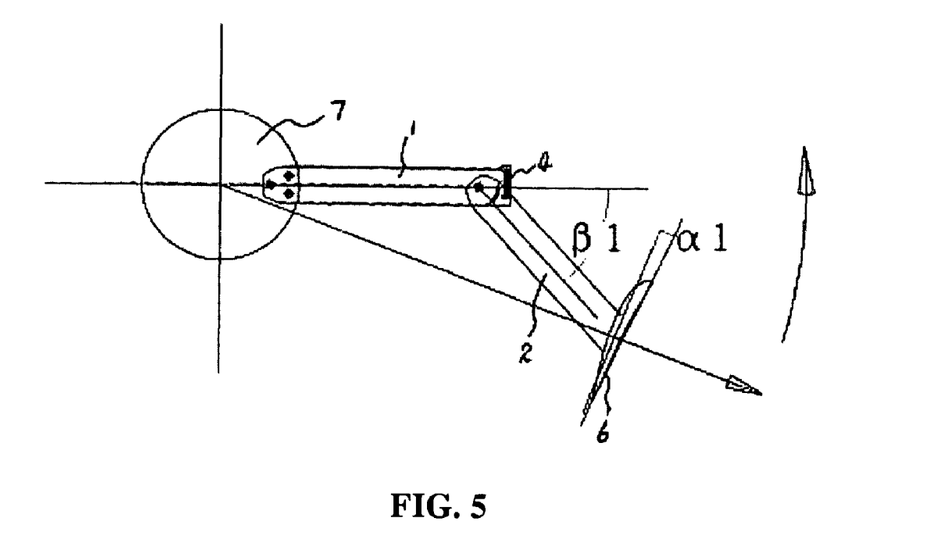
FIG. 5 is the schematic diagram of the positions of the initial angle β1 and rotation angle α1 of the blade support limb of the present invention.
Figure 6:
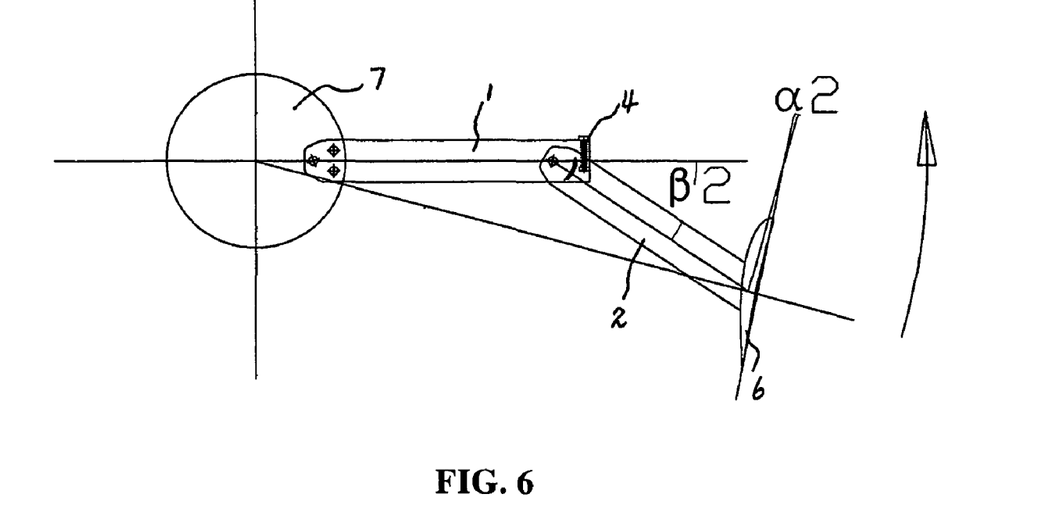
FIG. 6 is the schematic diagram of the positions of the initial angle β1 and rotation angle α2 of the blade support limb of the present invention.

In one embodiment of the present invention, a control component (4) is connected at the other end (22) of the rotatable support limb, which is used to control the rotation angle (β) of the rotatable support limb (2) around the gyration center axis (3). As shown in FIGS. 5 and 6, angle β is the angle between the rotatable support limb and extension line of the fixed support limb, and the vertex of angle β is the gyration center axis (3). The control component is connected with one end (12') of the fixed support limb adjacent to the rotatable support limb, by means of which a number of control components (4) is arranged orderly along the single direction of the wind rotor.

In another embodiment of the present invention, there is a control component (4) at one end (12) of the fixed support limb, which is used to control the rotation angle (β) of the rotatable support limb (2) around the gyration center axis (3).

In yet another embodiment of the present invention, there is a control component (4) at one end (21) of the rotatable support limb, which is used to control the rotation angle (β) of the rotatable support limb (2) around the gyration center axis (3).

Two ends, (41) and (42), of the control component are respectively connected to one end (21) of the rotatable support limb and one end (12) of the fixed support limb, and control the rotation angle (β) of the rotatable support limb (2) around the gyration center axis (3).

The control component (4) is one or more kinds of flexible component, hydraulic component and electrical component.

There is a stop slot or stop pin at one end (12) of the fixed support limb, which is used to confine the rotation angle (β) of the rotatable support limb (2).

The length ratio of the rotatable support limb (2) and the fixed support limb (1) is 1:9~9:1.

The length ratio of the rotatable support limb (2) and the fixed support limb (1) is 1:1.

The other end (11) of the fixed support limb is connected with the vertical axis (7).

The other end (11) of the fixed support limb is connected with the flange on the vertical axis (7).

The other end (22) of the rotatable support limb is connected with blade (6).

The other end (22) of the rotatable support limb is fixed with blade (6).

Through improving the blade support limb structure, this invention keeps a wind wheel at stable rotation speed under the condition that the environmental wind speed exceeds the rated wind speed, thereby to ensure that vertical axis wind turbine outputs constant power.

This invention will be described below on the basis of attached drawings and method of implementation.

BRIEF DESCRIPTION OF THE DRAWINGS

Detailed description will be given below with reference to accompanying drawings, in which.

DETAILED DESCRIPTION OF THE EMBODIMENTS

The following embodiments give further detailed description of the present invention, but do not limit the scope of the present invention.

Example 1

Figure 3:
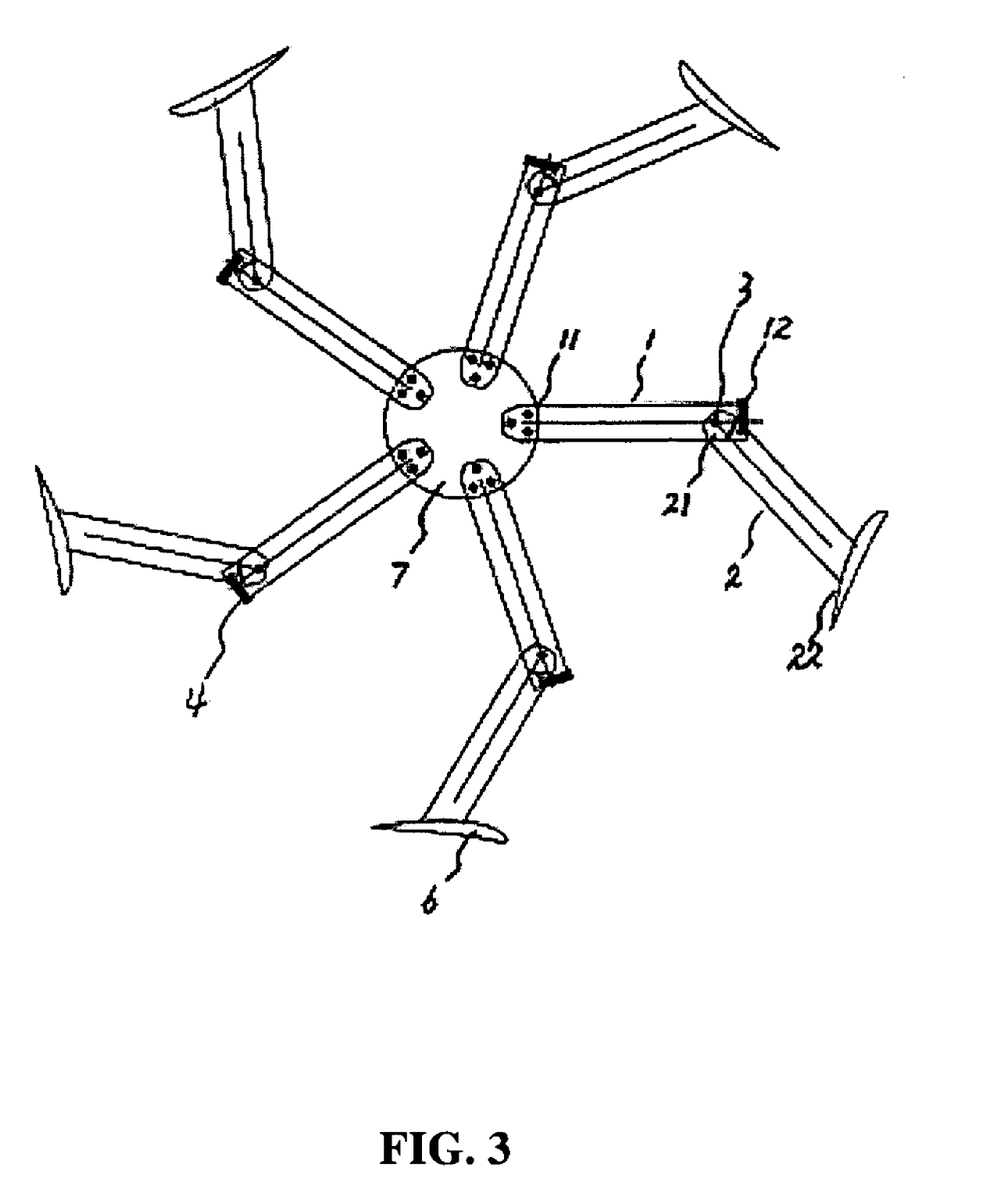
FIG. 3 is the structural diagram of the blade support limb of the present invention.
Figure 7:
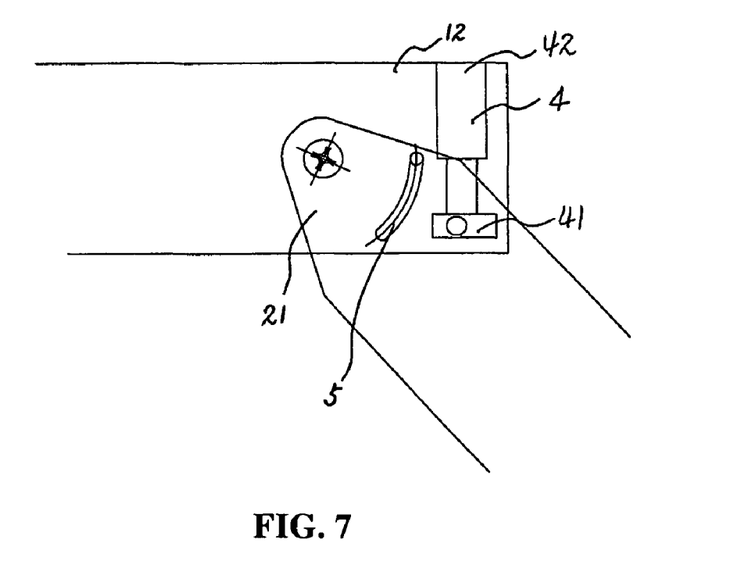
FIG. 7 is the enlarged view of the connection component of the blade support limb of the present invention.
Figure 8:
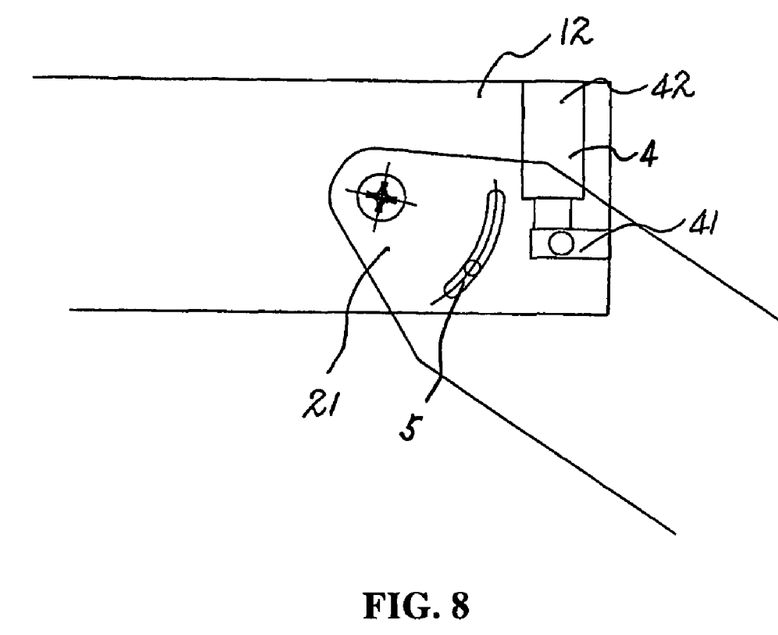
FIG. 8 is the enlarged view of the connection component of the blade support limb of the present invention.

FIG. 3 shows the blade support limb structure for the vertical axis wind turbine of the present invention. The other end (11) of the fixed support limb (1) is fixed with the flange on the vertical axis. One end (21) of a rotatable support limb (2) is connected with one end (12) of the fixed support limb, and may rotate around one end (12) of the fixed support limb. The other end (22) of the rotatable support limb is fixed with the blades. There is a gyration center axis (3) at the connection of one end (21) of the rotatable support limb and one end (12) of the fixed support limb, and the rotatable support limb may rotate around it. There is a control component (4) at one end (12) of the fixed support limb, which is used to control the rotation angle (β) of the rotatable support limb (2) around the gyration center axis (3). Both ends (41) (42) of the control component are respectively connected to one end (21) of the rotatable support limb and one end (12) of the fixed support limb and control the rotation angle (β) of the rotatable support limb (2) around the gyration center axis (3). The control component (4) is flexible component (may also be replaced by hydraulic component or electrical component, which needs only to control the changes of the rotation angle (β) of the rotatable support limb (2) around the gyration center axis (3)). There is a stop slot (may also be replaced by stop pin) at one end (12) of the fixed support limb, which is used to confine the rotation angle (β) of the rotatable support limb (2) to change within certain controlled range, which plays a further role of getting stable and safe operation of the blade support limb structure in this invention. FIGS. 7 and 8 are the enlarged view of the connection component of the blade support limb in this invention.

Figure 4:
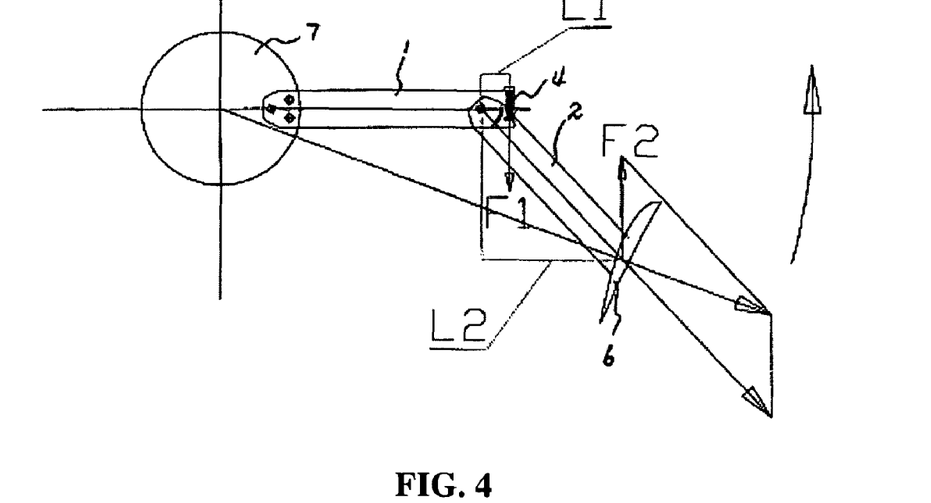
FIG. 4 is the schematic diagram of the forces acting on the blade support limb of the present invention.

As shown in FIGS. 4, 5, and 6, the initial angle of the rotatable support limb is β1. There is a flexible component (4) (press spring stacks) at the fixed support limb (1) of one end of stop slot (5). Since the concave face of the blade faces outside and the blade has a fixed rotation angle α1 at the initial position, a driving force of rotating around the vertical axis is produced on the blade under the driving of the wind. FIG. 4 is the schematic diagram of forces acting the blade support limb in this invention. When the wind rotor rotates under a wind speed less than the rated wind speed, the restoring torque of the press spring L1*F1 (L1 is the arm of force of the press spring rotating around the gyration center axis (3), F1 is the force impact on the press spring) is larger than the centrifugal torque F2*L2 (L2 is the arm of force of the blade rotating around the gyration centre axis, F2 is the force impact on the blade) on it. The rotatable support limb is confined by the stop slot (5) at the initial position, i.e., the rotation angle β1 between the fixed support limb (1) and the rotatable support limb (2) keeps unchanged, and the rotation angle α1 keeps unchanged. The initial angle β1 between the fixed support limb and the rotatable support limb is relatively large so that the wind rotor can get a relatively large centrifugal force during the rotation. The optimal ratio of the length of the fixed support limb (1) to that of the rotatable support limb (2) is about 1:1, then the blade can get a relatively large centrifugal force and the rotation angle α1 can also change synchronically with β1. When the length ratio of the rotatable support limb (2) to the fixed support limb (1) is 1:9, β changes by only a very small angle, then a can reach the required angle. However, when the length ratio of the rotatable support limb (2) and the fixed support limb (1) reaches 9:1, β needs to change relatively greatly, then a can reach the required angle. The extreme condition is that the rotatable support limb is directly installed on the flange and the fixed support limb is omitted, the principle of which is similar to changing the angle of attack of the angle. Therefore, the optimal length ratio of the fixed support limb (1) and the rotatable support limb (2) is about 1:1, the blade can get a relatively large centrifugal force and rotation angle α1 can change synchronically with β1.

As the environmental wind speed exceeds the rated wind speed, the rotation speed of the wind rotor continuously increases along with the increase of wind speed. When the wind speed exceeds the rated wind speed, and then the rotation speed also exceeds the rated rotation speed, the restoring torque of press spring L1*F1 is less than the centrifugal torque L2*F2. Under the impact of the centrifugal torque, the rotatable support limb (2) rotates around its gyration center axis (3) and along with the rotating direction of the wind rotor. Since the blade is fixed with the rotatable support limb (2), as the wind speed, the rotation speed and the centrifugal force increase, the angle β1 between the rotatable support limb (2) and the fixed support limb (1) gradually decreases to β2, equal to changing the blade rotation angle α1, getting the rotation angle of the blade to change from relatively small positive angle to negative one, i.e. the blade rotation angle α1 changes from positive angle to negative angle α2, as is shown in FIG. 6. For the application of changing the blade rotation angle, please refer to the Chinese Patent Application Publication No. CN1831330A and Chinese Patent Application No. 200610028267.7 by the same inventor. For the vertical axis wind turbine with the concave face of blade facing outside, when blade rotation angle is less than 2 degrees, the rotation speed and power of the wind rotor will decrease. Through computer simulative calculation (CFD), when the blade rotation angle changes from a positive value to a negative one, the rotation speed and torque of the wind rotor will decrease rapidly. Moreover, the smaller the negative value of the blade rotation angle is, the more rapidly the rotation speed decreases. When the negative value is less than a certain value, the torque direction of the wind rotor changes and the wind rotor gradually slows down. When the rotation speed of the wind rotor decreases, the rotatable support limb restores to the initial position under the impact of the restoring torque of the press spring. This forms a continuous cycle and thus maintains a stable rotation speed and power of the wind rotor when the wind speed exceeds the rated wind speed.

Example 2

For the blade support limb structure in Example 1, it is set as the prerequisite that the wind rotor with the diameter 1.36 m consists of blades of Goe63 airfoil, the length ratio of fixed support limb to rotatable support limb is 1:1, and the rated wind speed is 10 m/s, i.e., the wind speed of such device begins to affect the vertical axis wind turbine from 10 m/s. Through CFD, when the wind speed increases from 10 m/s to 15 m/s, 20 m/s and 25 m/s, the output power increases respectively from 170 watts to 210 watts, 220 watts and 230 watts. But the output power will increase from 170 watts to about 2660 watts without the blade support limb structure in this invention.

| CFD calculation table | | | | |
|---|---|---|---|---|
| | wind speed | | | |
| | 10 m/s | 15 m/s | 20 m/s | 25 m/s |
| Power output by using existing blade support limb structure (watt) | 170 | 350 | 1360 | 2660 |
| Power output by using the blade support limb structure in this invention (watt) | 170 | 210 | 225 | 230 |

Example 3

Also for the blade support limb structure in Example 1, wind tunnel tests are performed by means of the same wind rotor and parameters. It is set as the prerequisite that the length ratio of fixed support limb to rotatable support limb is 1:1, when the wind speed increases from 10 m/s to 15 m/s, 20 m/s and 25 m/s, the output power of the motor increases respectively from 158 watts to 193 watts, 198 watts and 202 watts. But the output power of the motor will reach about 2600 watts without such device.

| Table of wind tunnel tests | | | | |
|---|---|---|---|---|
| | wind speed | | | |
| | 10 m/s | 15 m/s | 20 m/s | 25 m/s |
| Power output by using existing blade support limb structure (watt) | 160 | 570 | 1320 | 2600 |
| Power output by using the blade support limb structure in this invention (watt) | 158 | 193 | 198 | 202 |

Example 4

Figure 9:
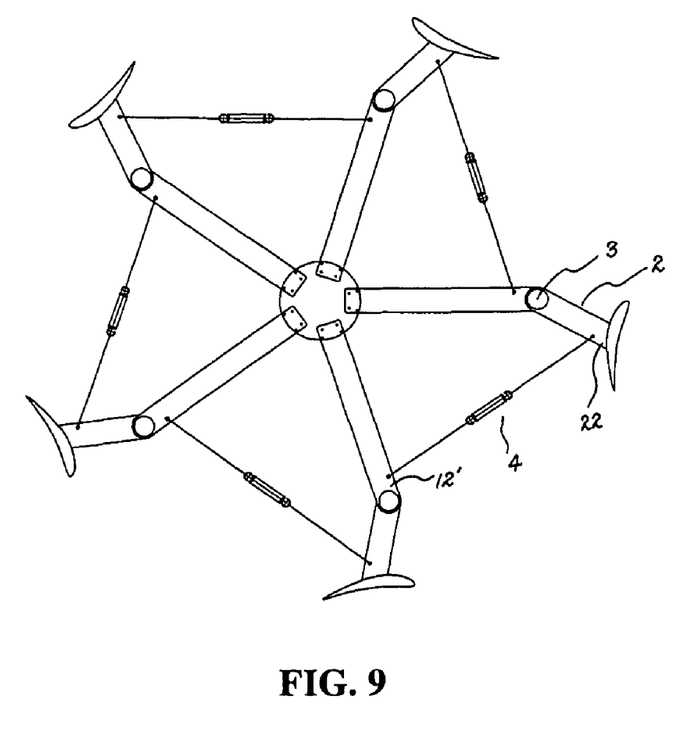
FIG. 9 is the structural diagram of another embodiment of the blade support limb of the present invention.

FIG. 9 is the structural diagram of another embodiment of the blade support limb in this invention.

A control component (4) is connected with the other end (22) of the rotatable support limb, which is used to control the rotation angle (β) of the rotatable support limb (2) around the gyration center axis (3). The control component is connected with one end (12') of the fixed support limb adjacent to the rotatable support limb, by means of which a number of control components (4) is arranged orderly along the single direction of the wind rotor. The control component (4) is flexible component (may also be replaced by hydraulic component or electrical component, which needs only to control the changes of the rotation angle (β) of the rotatable support limb (2) around the gyration center axis (3)). There can also be a stop slot (5) (may also be replaced by stop pin) at one end (12) of the fixed support limb, which is used to confine the rotation angle (β) of the rotatable support limb (2) to change within certain controlled range, which plays a further role of getting stable and safe operation of the blade support limb structure in this invention. By the blade support limb structure in this Implementation Example and the wind tunnel tests in Implementation Example 2 and 3, this invention manages to solve the problem of constant power output.

From these implementation examples we can get that the blade support limb structure in this invention overcomes the design defects of existing vertical axis wind turbine, thereby solves a problem of constant power output of vertical axis wind turbine from several watts to dozens of watts or even hundreds of kilowatts and is applied to small vertical axis wind turbine with hundreds of watts, so its application is wide.

In spite of a detailed description of this invention and some implementation examples, it is evident that the skilled technicians in this field may make changes and amendments, but the inventor's idea and scope of design shall be followed.

The invention claimed is:

1. A blade support limb for a vertical axis wind turbine having a vertical shaft and blades, comprising
   fixed support limbs, each having a first end that is connected to the vertical shaft and a second end;
   rotatable support limbs, each corresponding to one of the fixed support limbs, and each of the rotatable support limbs having a third end that is connected to the second end of the corresponding fixed support limb and a fourth end that is connected to one of the blades;
   gyration center axes, each disposed between the second end of the fixed support limbs and the third end of the corresponding rotatable support limbs; and
   multiple control devices, each arranged between the rotatable support limb and an adjacent fixed support limb, and each of the control devices having a fifth end that is connected to the fourth end of the rotatable support limb and a sixth end that is connected to the second end of the adjacent fixed support limb,
   wherein
   the rotatable support limbs are capable of rotating around the corresponding gyration center axes and rotatable around the second end of the corresponding fixed support limbs;
   and
   said control devices are elastic components and control rotation angle ($\beta$) of the corresponding rotatable support limbs around the corresponding gyration center axes.

2. The blade support limb for a vertical axis wind turbine of claim 1, further comprising
   a stop slot that is disposed on said second end and operates to restrain the rotation angle ($\beta$).

3. The blade support limb for a vertical axis wind turbine of claim 1, further comprising
   a stop pin that is disposed on said second end and operates to restrain the rotation angle ($\beta$).

4. The blade support limb for a vertical axis wind turbine of claim 1, wherein a ratio between a length of the rotatable support limb and that of the fixed support limb is in a range of 1:9 to 9:1.

5. The blade support limb of claim 1, wherein a ratio between a length of said rotatable support limb and that of said fixed support limb is 1:1.

6. The blade support limb of claim 1, wherein each of the multiple control devices is arranged along a single direction of a wind rotor of the wind turbine between the adjacent limbs.

7. A blade support limb for a vertical axis wind turbine having a vertical shaft and blades, comprising
   fixed support limbs, each having a first end that is connected to the vertical shaft and a second end;
   rotatable support limbs, each corresponding to one of the fixed support limbs, and each of the rotatable support limbs having a third end that is connected to the second end of the corresponding fixed support limb and a fourth end that is connected to the one of the blades;
   gyration center axes, each disposed between the second end of the fixed support limb and the third end of the corresponding rotatable support limb; and
   control devices, each corresponding to the fixed support limb and the corresponding rotatable support limb, and each of the control devices disposed on the second end of the corresponding fixed support limb and having a fifth end and a sixth end;
   wherein
   the rotatable support limbs are capable of rotating around said second end of the corresponding fixed support limbs and the corresponding gyration center axes;
   and
   said control devices are elastic components; said fifth end of the control device is connected to said third end of the corresponding rotatable support limb, and said sixth end of the control device is connected to said second end of the corresponding fixed support limb so as to control a rotation angle ($\beta$) of the corresponding rotatable support limb around the corresponding gyration center axis.

8. The blade support limb for a vertical axis wind turbine of claim 7, further comprising
   a stop slot that is disposed on said second end and operates to restrain the rotation angle ($\beta$).

9. The blade support limb for a vertical axis wind turbine of claim 7, further comprising
   a stop pin that is disposed on said second end and operates to restrain the rotation angle ($\beta$).

10. The blade support limb for a vertical axis wind turbine of claim 7, wherein a ratio between a length of the rotatable support limb and that of the fixed support limb is in a range of 1:9 to 9:1.

11. The blade support limb of claim 7, wherein a ratio between a length of said rotatable support limb and that of said fixed support limb is 1:1.

12. A blade support limb for a vertical axis wind turbine having a vertical shaft and blades, comprising
    fixed support limbs, each having a first end that is connected to the vertical shaft and a second end;
    rotatable support limbs, each corresponding to one of the fixed support limbs and each of the rotatable support limbs having a third end that is connected to the second end of the corresponding fixed support limb and a fourth end that is connected to one of the blades;
    gyration center axes, each corresponding to and is disposed between the fixed support limb and the corresponding rotatable support limb; and
    control devices, each disposed on the third end of the rotatable support limb and each of the control devices having a fifth end and a sixth end;
    wherein;
    the rotatable support limbs are capable of rotating around said second end of the corresponding fixed support limbs and the corresponding gyration center axes;
    and the control devices are elastic components; said fifth end of the control device is connected to said third end of the corresponding rotatable support limb and said sixth end of the control device is connected to said second end of the corresponding fixed support limb so as to control a rotation angle ($\beta$) of the corresponding of rotatable support limb around the gyration center axis.

13. The blade support limb for a vertical axis wind turbine of claim 12, further comprising
    a stop slot that is disposed on said second end of the fixed support limb, and operates to restrain the rotation angle ($\beta$).

14. The blade support limb for a vertical axis wind turbine of claim 12, further comprising
    a stop pin that is disposed on said second end of the fixed support limb and operates to restrain the rotation angle ($\beta$).

15. The blade support limb for a vertical axis wind turbine of claim 12, wherein a ratio between a length of said rotatable support limb and that of said fixed support limb is between 1:9 and 9:1.

16. The blade support limb of claim 12, wherein a ratio between a length of said rotatable support limb and that of said fixed support limb is 1:1.

\* \* \* \* \*